US012723941B2

(12) United States Patent
Sakai

(10) Patent No.: US 12,723,941 B2
(45) Date of Patent: Sep. 1, 2026

(54) ELECTRONIC DEVICE

(71) Applicant: EAGLE INDUSTRY CO., LTD., Tokyo (JP)

(72) Inventor: Norihiro Sakai, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 725 days.

(21) Appl. No.: 18/022,461

(22) PCT Filed: Aug. 6, 2021

(86) PCT No.: PCT/JP2021/029355

§ 371 (c)(1),
(2) Date: Feb. 21, 2023

(87) PCT Pub. No.: WO2022/044778

PCT Pub. Date: Mar. 3, 2022

(65) Prior Publication Data

US 2023/0341283 A1 Oct. 26, 2023

(30) Foreign Application Priority Data

Aug. 28, 2020 (JP) ................................ 2020-144223

(51) Int. Cl.
*G01L 19/00* (2006.01)
*H01M 50/247* (2021.01)

(52) U.S. Cl.
CPC ....... *G01L 19/0084* (2013.01); *H01M 50/247* (2021.01)

(58) Field of Classification Search
CPC .............. H01M 50/247; H01M 50/569; G01L 19/0084
See application file for complete search history.

(56) References Cited

U.S. PATENT DOCUMENTS

| | | | |
|---|---|---|---|
| 2007/0120524 A1 | 5/2007 | Shum | |
| 2020/0373713 A1 | 11/2020 | Li et al. | H01R 13/7032 |

FOREIGN PATENT DOCUMENTS

| | | | |
|---|---|---|---|
| CN | 108110198 | 6/2018 | H01M 2/20 |
| JP | H08236103 | 9/1996 | H01M 2/34 |
| JP | 2019153485 | 9/2019 | H01M 2/10 |
| WO | 2008005325 A2 | 1/2008 | |

OTHER PUBLICATIONS

European Search Report issued in EP Patent Appln. No. 21861206.7, dated Jul. 12, 2024, 7 pgs.
International Preliminary Report on Patentability issued in PCT/JP2021/029355, dated Feb. 28, 2023, 4 pages.
International Search Report and Written Opinion issued in PCT/JP2021/029335, dated Oct. 19, 2021, with English translation, 11 pages.

*Primary Examiner* — Maria Laios
*Assistant Examiner* — Jordan E Berresford
(74) *Attorney, Agent, or Firm* — HAYES SOLOWAY P.C.

(57) ABSTRACT

In an electronic device configured for energizing loads in accordance with attachment and detachment of a battery, in the process of attachment and detachment of the battery, a positive terminal on the load side and a positive terminal of the battery are electrically connected and disconnected to each other in a state in which a negative terminal on the load side is electrically connected to a negative terminal of the battery.

5 Claims, 11 Drawing Sheets

ELECTRONIC DEVICE

TECHNICAL FIELD

The present invention relates to a battery-powered electronic device.

BACKGROUND ART

A battery-powered electronic device requires no connection to an external power source, so that it can be used anywhere.

For example, a sensor device described in Patent Citation 1 is an electronic device that senses the state of a manufacturing device installed on a manufacturing line, and includes a button cell as a power source. Further, a battery holder for holding the button cell can be inserted into a slit-shaped insertion portion of a housing to supply the sensor device with power. The battery holder is configured such that a first terminal and a second terminal that are brought into contact with a positive electrode and a negative electrode of the button cell, respectively, a processing circuit processing the output of a sensor element, a communication circuit communicating with the outside, and a connector configured to be electrically connected to the sensor element, or the like are mounted on a support substrate. The button cell is mounted in the battery holder, so that the first terminal and the second terminal on the load side to which the processing circuit, the communication circuit, etc. are connected are electrically connected to the positive electrode and the negative electrode of the button cell.

CITATION LIST

Patent Literature

Patent Citation 1: JP 2019-153485 A (Pages 8 and 9, FIG. 6)

SUMMARY OF INVENTION

Technical Problem

However, in the battery holder described in Patent Citation 1, when the button cell is attached to and detached from the battery holder, the positive electrode of the button cell may be connected to the positive terminal with the reference potential on the ground side, which is the reference of the circuit operation, being not determined. Accordingly, the voltage may become unstable due to the residual charge in the processing circuit, the communication circuit, or the like provided on the load side, to impose a negative effect such as malfunction or damage of the circuit.

The present invention has been made in view of such problems, and an object of the present invention is to provide an electronic device that enables stable circuit operation.

Solution to Problem

In order to solve the problems described above, an electronic device according to the present invention is an electronic device including a load and configured for energizing the load in accordance with attachment and detachment of a battery to and from the electronic device, wherein, the electronic device further includes a positive terminal and a negative terminal on a load side, in a process of the attachment and the detachment of the battery, the positive terminal on the load side and a positive terminal of the battery are electrically connected to and disconnected from each other in a state in which the negative terminal on the load side is electrically connected to a negative terminal of the battery. According to the aforementioned feature of the present invention, when the battery is attached, the negative terminal on the load side is first electrically connected to the negative terminal of the battery, so that the positive terminal on the load side and the positive terminal of the battery can be electrically connected to each other with the reference potential of the circuit being determined, to set the circuit as a target potential difference. Further, when the battery is detached, the electrical connection between the negative terminal on the load side and the negative terminal of the battery is maintained, and the positive terminal on the load side and the positive terminal of the battery can be first electrically disconnected to each other with the reference potential of the circuit being determined. Accordingly, in the process of attachment and detachment of the battery, the circuit can be reliably set to the target potential difference to enable the stable circuit operation.

It may be preferable that, the electronic device further includes a switch that switches between an electrical connection and an electrical disconnection of the positive terminal on the load side and the positive terminal of the battery according to an operation of the attachment and the detachment of the battery. According to this preferable configuration, the operation of the switch that switches between the electrical connection/disconnection of the positive terminal on the load side and the positive terminal of the battery according to the operation of the attachment and the detachment of the battery, can be reliably performed to enable the stable circuit operation.

It may be preferable that the switch is provided on a member on the load side. According to this preferable configuration, since the switch is configured on the member on the load side, a specially shaped battery is not required to be used, and various types of batteries can be used.

It may be preferable that the positive terminal and the negative terminal on the load side are arranged side by side, and the switch is a return switch that projects in an extending direction of the positive terminal and the negative terminal on the load side so as to be returnable. According to this preferable configuration, when the battery is attached, the switch is pressed and retracted to electrically connect the positive terminal on the load side and the positive terminal of the battery with the positive terminal and the negative terminal of the battery being in contact with the positive terminal and the negative terminal on the load side. Further, when the battery is detached, the switch returns in the extending direction of the positive terminal and the negative terminal on the load side to electrically disconnect the positive terminal on the load side and the positive terminal of the battery with the contact between the positive terminal and the negative terminal of the battery and the positive terminal and the negative terminal on the load side being maintained.

It may be preferable that the positive terminal and the negative terminal on the load side are be returnable in the extending direction. According to this preferable configuration when the battery is attached, the switch is pressed and retracted to electrically connect the positive terminal on the load side and the positive terminal of the battery in the process of the positive terminal and the negative terminal on the load side being retracted due to the contact between the positive terminal and the negative terminal of the battery and the positive terminal and the negative terminal on the load side. Further, when the battery is detached, the switch returns in the extending direction of the positive terminal and the negative terminal on the load side to electrically disconnect the positive terminal on the load side and the positive terminal of the battery with the positive terminal and the negative terminal of the battery being pressed against the positive terminal and the negative terminal on the load side with the restoring force to ensure that the contact therebetween is maintained.

It may be preferable that the electronic device further includes a battery holder that holds the battery, and the battery holder is provided with a projection configured for pressing the switch. According to this preferable configuration, the switch is pressed by the projection of the battery holder according to the operation of attaching and detaching the battery, so that the operation timing of the switch can be adjusted according to the projection amount of the projection.

It may be preferable that the electronic device further includes a positioning mechanism configured for positioning the battery holder. According to this preferable configuration, the battery holder can be positioned to reliably press the switch with the projection of the battery holder, and the movement of the battery holder can be restricted to reliably hold the state of the switch being pressed by the projection.

BRIEF DESCRIPTION OF DRAWINGS

FIG. 4 illustrates a state in which an outer case is removed.

FIG. 5 illustrates a state in which the outer case is removed.

DESCRIPTION OF EMBODIMENTS

Figure 1:
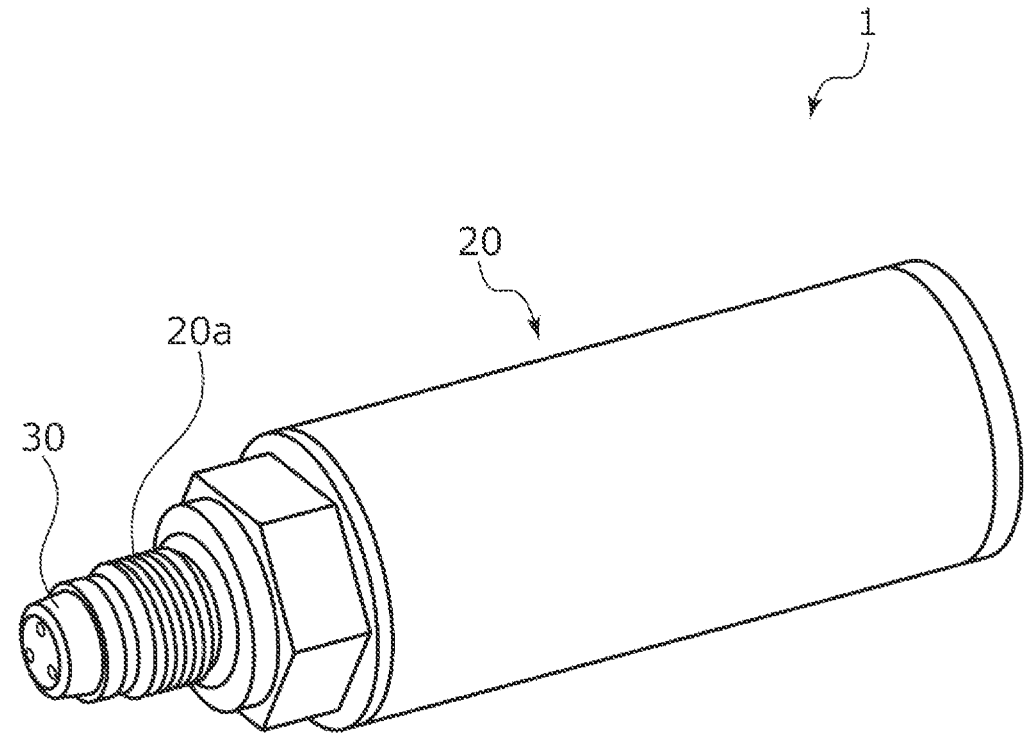
FIG. 1 is a perspective view illustrating a pressure sensor as an electronic device according to a first embodiment of the present invention.

Modes for carrying out an electronic device according to the present invention will be described below based on embodiments. The battery used in the electronic device according to the present invention may be a battery which can be attached to and detached from the body of the electronic device, or be a battery held by a battery holder which can be attached to and detached from the body of the electronic device. In the latter case, the positive electrode and the negative electrode of the battery may be directly electrically connected to a circuit on the load side, or may be indirectly electrically connected to the circuit via terminals provided in the battery holder.

First Embodiment

An electronic device according to a first embodiment of the present invention will be described with reference to FIGS. 1 to 9. Hereinafter, the left and right sides when viewed from the front side of FIG. 3 will be described as the left and right sides of the electronic device. Specifically, the left side of the drawing on which a sensor unit 30 is provided will be described as the left side of the electronic device, and the right side of the drawing on which a cap member 23 is attached will be described as the right side of the electronic device.

As illustrated in FIG. 1, the electronic device according to the first embodiment of the present invention is a pressure sensor 1 configured to detect the pressure of an object to be measured and including a battery 10 (see FIG. 2) as a power source. The pressure sensor 1 is fixed to an installed portion such as a pipe, a duct, or a tank (not illustrated), and detects the pressure of the object to be measured inside the installed portion. The object to be measured is a fluid such as a liquid or a gas.

Figure 2:
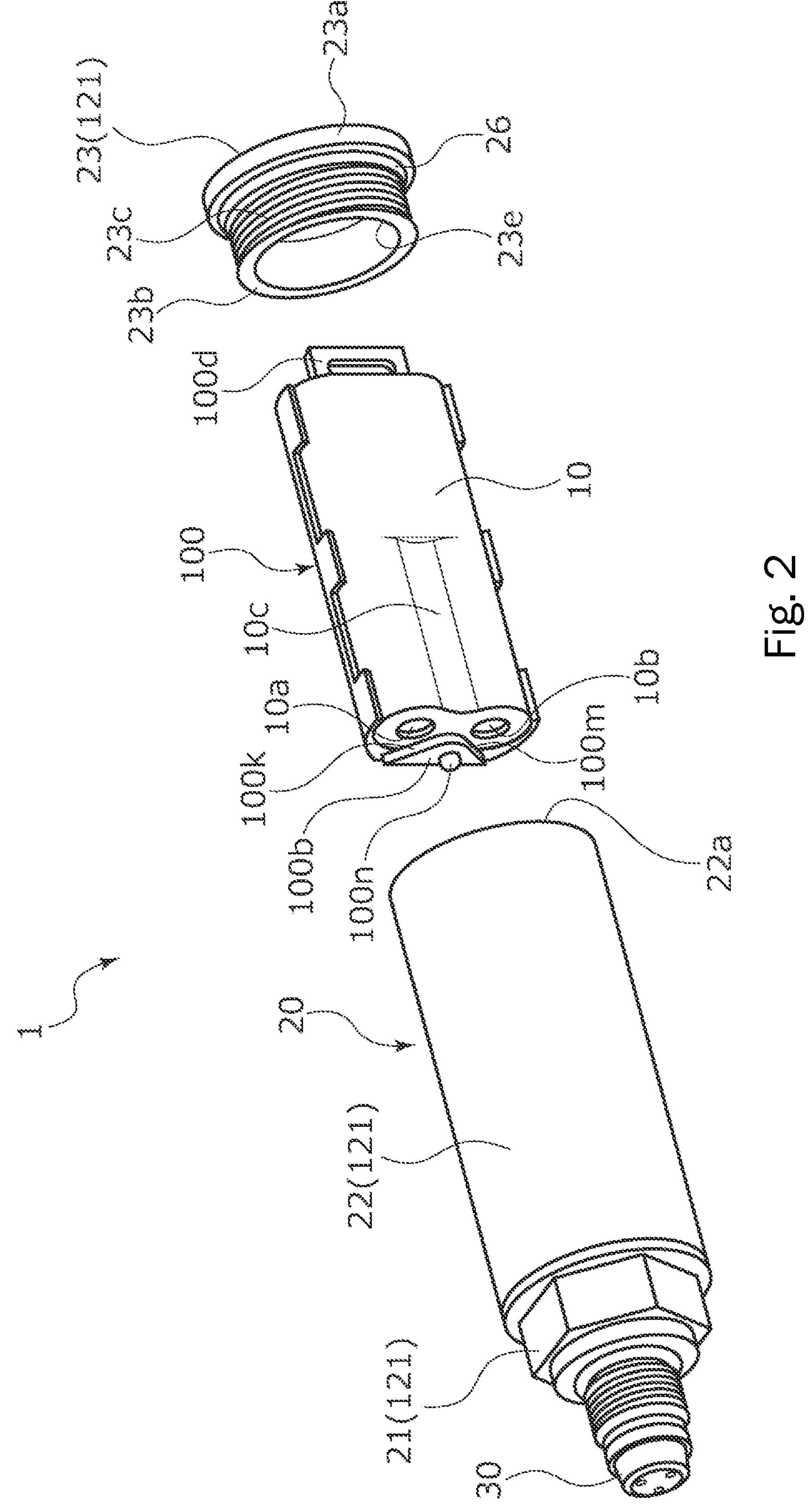
FIG. 2 is an exploded perspective view illustrating the structure of the pressure sensor in the first embodiment.
Figure 3:
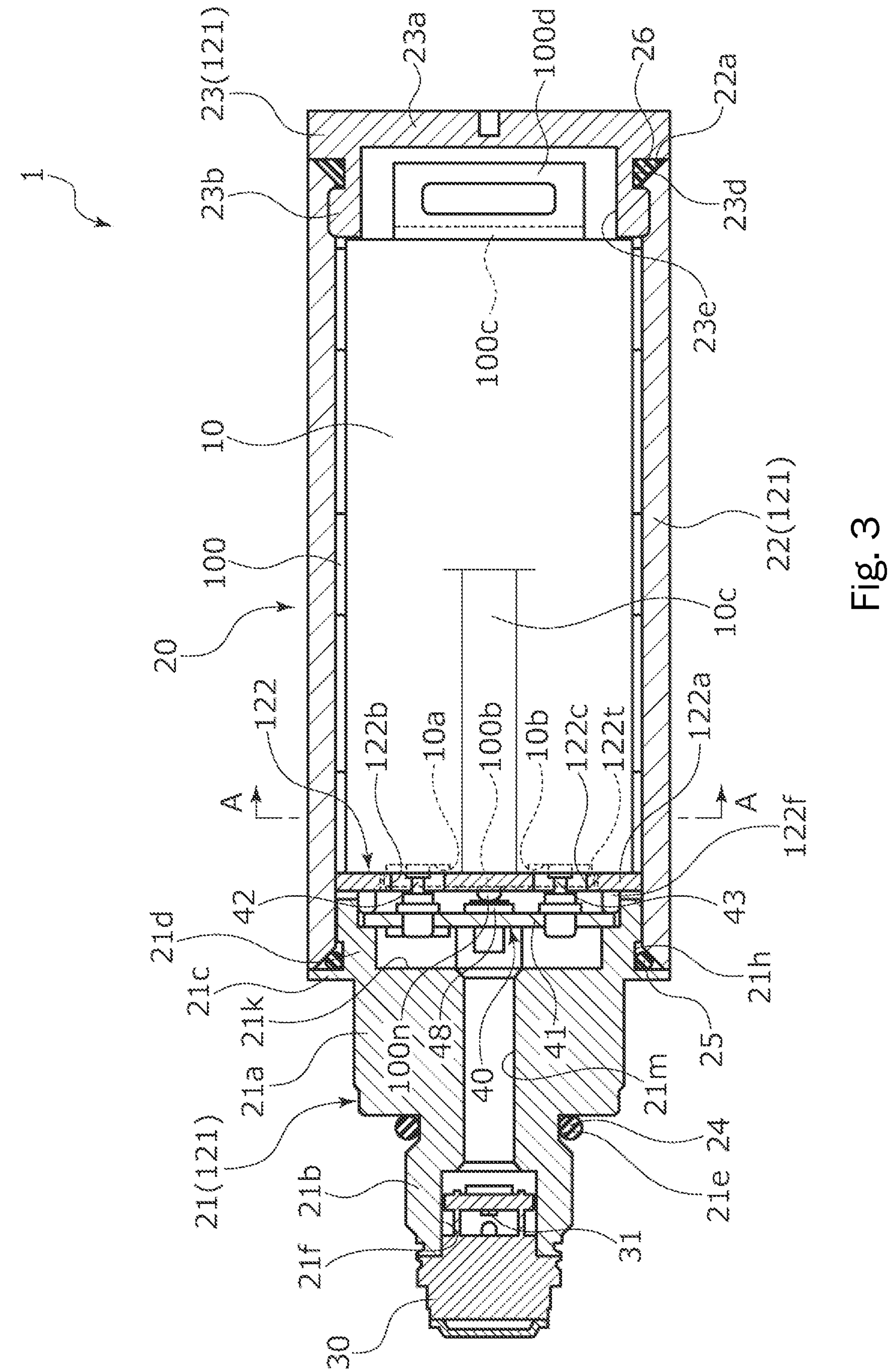
FIG. 3 is a cross-sectional view illustrating the structure of the pressure sensor in the first embodiment.

As illustrated in FIG. 1, the pressure sensor 1 mainly includes a housing 20, the sensor unit 30, a battery holder 100 (see FIG. 2), and a circuit unit 40 (see FIG. 3). The sensor unit 30 is attached to the left end portion of the housing 20. The battery holder 100 is placed in the housing 20 and holds the battery 10. A load according to the present invention is composed of the sensor unit 30 and the circuit unit 40.

For example, a screw portion 20*a* of the housing 20 is screwed into a mounting port of a pipe (not illustrated) to fix and use the pressure sensor 1. The screw portion 20*a* is formed at the left end portion of the outer periphery of the housing 20. Accordingly, a sensor element (not illustrated) provided in the sensor unit 30 outputs a voltage corresponding to the pressure applied from the object to be measured, the fluid, inside the pipe. A processing chip 31 (see FIG. 3) converts this voltage into a pressure signal.

Figure 4:
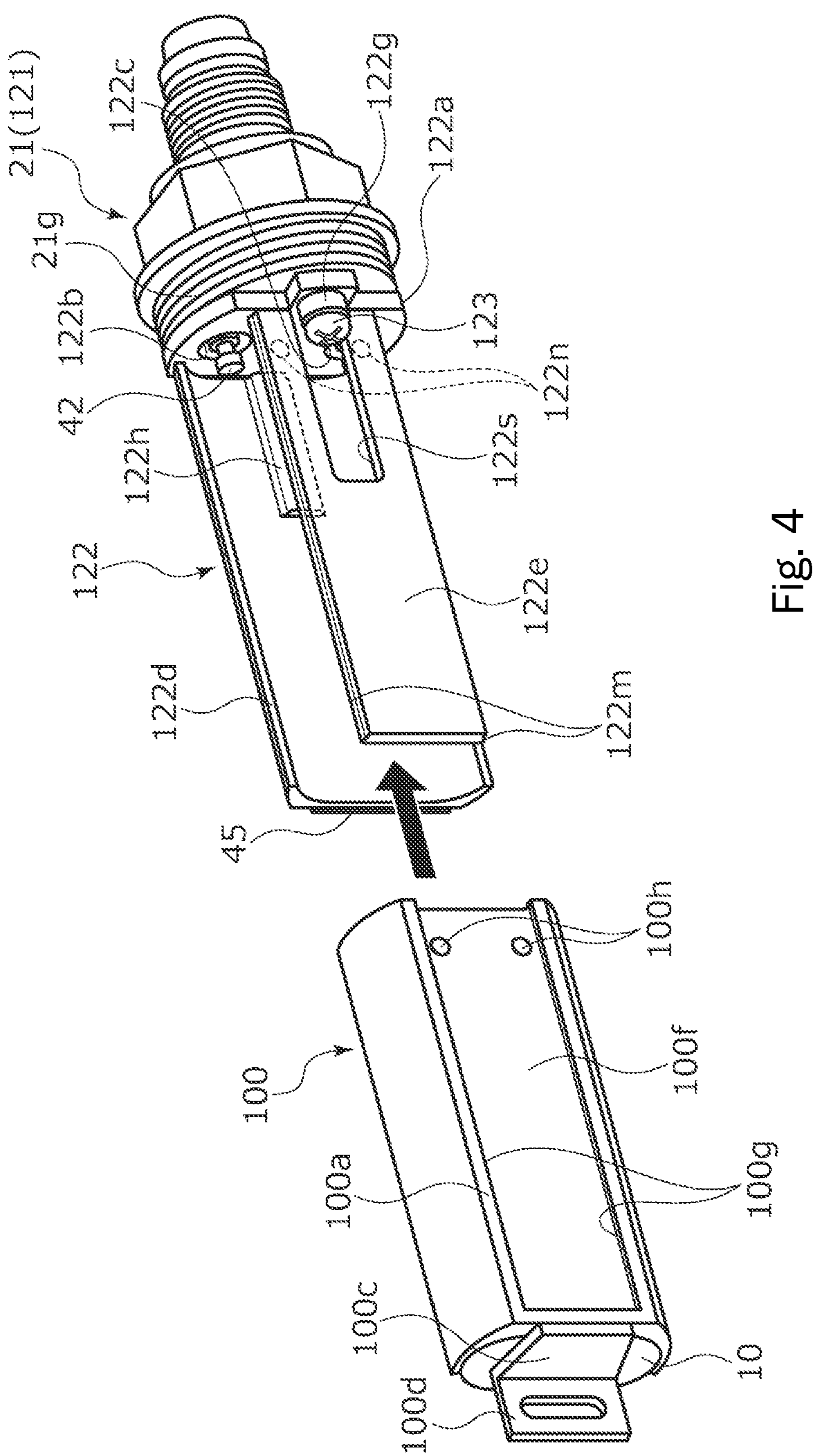
FIG. 4 is a perspective view illustrating the structure of an inner case and a battery holder in the first embodiment. For convenience of explanation.
Figure 5:
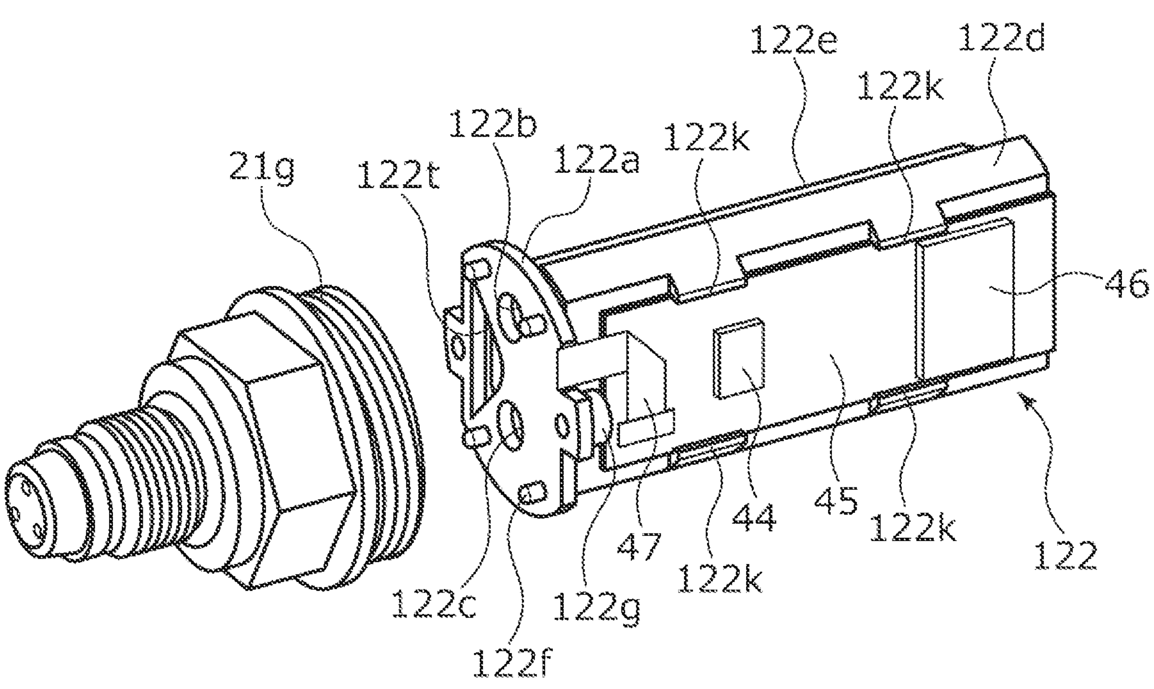
FIG. 5 is an exploded perspective view illustrating the structure of the inner case in the first embodiment. For convenience of explanation.

As illustrated in FIGS. 2 and 3, the housing 20 includes a mounting member 21, an outer case 121, and an inner case 122 (see FIGS. 4 and 5). The screw portion 20*a* (see FIG. 1) is formed at the left end portion of the mounting member 21. The outer case 121 includes a cover member 22 attached to the right end portion of the mounting member 21 and the cap member 23 closing an opening 22*a* on the right side of the cover member 22. The inner case 122 is fixed to the mounting member 21 and is covered with the cover member 22 and the cap member 23, namely, the outer case 121.

As illustrated in FIG. 3, the mounting member 21 includes a tubular base portion 21*a*, a small diameter portion 21*b* extending to the left from the base portion 21*a*, a flange portion 21*c* projecting radially outward from the right end portion of the outer periphery of the base portion 21*a*, and a large diameter portion 21*d* extending to the right from the base portion 21*a*.

The small diameter portion 21*b* has the screw portion 20*a* (see FIG. 1) described above formed on the outer periphery. The small diameter portion 21*b* also has an annular recess 21*e* formed at the right end portion of the outer periphery, and an O-ring 24 is mounted on the recess 21*e*. The screw portion 20*a* formed on the outer periphery of the small diameter portion 21*b* is screwed into the mounting port of the pipe (not illustrated) to compress the O-ring 24 between the pipe and the mounting member 21 to ensure the sealing performance.

Further, a recess 21*f* is formed at the left end portion of the small diameter portion 21*b*, the recess 21*f* being recessed to the right, and the sensor unit 30 is inserted and fitted into the recess 21*f* from the left to be fixed by welding. Although details are omitted, the sealing performance is ensured so that the object to be measured, the fluid, would not enter the side of a through hole 21*m* on which the processing chip 31 is arranged.

The large diameter portion 21*d* has a screw portion 21*g* (see FIGS. 4 and 5) formed on the outer periphery. The large diameter portion 21*d* also has an annular recess 21*h* formed at the left end portion of the outer periphery, and an O-ring 25 is mounted on the recess 21*h*. A screw portion (not illustrated) formed on the inner periphery of the left end portion of the cover member 22 is screwed into the screw portion 21*g* formed on the outer periphery of the large diameter portion 21*d* to compress the O-ring 25 between the mounting member 21 and the cover member 22 to ensure the sealing performance.

Further, a stepped recess 21*k* is formed at the right end portion of the large diameter portion 21*d*, the stepped recess 21*k* being recessed to the left, and a part of the circuit unit 40 is placed in the recess 21*k*. The recess 21*f* formed in the small diameter portion 21*b* and the recess 21*k* formed in the large diameter portion 21*d* are communicated with each other through the through hole 21*m* extending through the base portion 21*a* in the left-right direction. Further, the sensor unit 30 and the circuit unit 40 are electrically connected to each other by a flexible printed wiring board (not illustrated) extending in the through hole 21*m*.

As illustrated in FIGS. 2 and 3, the cover member 22 constituting the outer case 121 forms a cylindrical shape, and the left end portion thereof is screwed into the screw portion 21*g* (see FIGS. 4 and 5) formed on the outer periphery of the large diameter portion 21*d* of the mounting member 21 to attach the cover member 22. Further, a screw portion 23*c* of the cap member 23 also constituting the outer case 121 is screwed into the right end portion of the cover member 22 to close the opening 22*a*.

The cap member 23 includes a disk-shaped base portion 23*a* and a small diameter portion 23*b* projecting to the left from the left side surface of the base portion 23*a*. The small diameter portion 23*b* has the screw portion 23*c* (see FIG. 2) formed on the outer periphery. The small diameter portion 23*b* also has an annular recess 23*d* formed at the right end portion of the outer periphery, and an O-ring 26 is mounted on the recess 23*d*. The screw portion 23*c* of the cap member 23 is screwed into a screw portion (not illustrated) formed on the inner periphery of the right end portion of the cover member 22 to compress the O-ring 26 between the cover member 22 and the cap member 23 to ensure the sealing performance. Accordingly, the internal space of the outer case 121 is defined to be substantially sealed, in which the circuit unit 40 and the battery holder 100 are placed.

Further, a recess 23*e* is formed at the left end portion of the small diameter portion 23*b*, the recess 23*e* being recessed to the right, and a handle 100*d* is placed in the recess 23*e*, the handle 100*d* being formed at the right end portion of the battery holder 100.

As illustrated in FIGS. 3 to 6, the inner case 122 is made of a resin material and includes the base portion 122*a*, and a first plate portion 122*d* and a second plate portion 122*e* that extend from the base portion 122*a* in a direction in which the cap member 23 is arranged, namely, to the right (to the left in FIG. 4). The base portion 122*a* of the inner case 122 is fixed to the mounting member 21 by screws 123 (see FIG. 4).

Especially illustrated in FIG. 5, the base portion 122*a* has through holes 122*b*, 122*c* formed side by side as described above. Further, the base portion 122*a* has a substantially triangular through hole 122*t* into and from which a wall portion 100*b* of the battery holder 100, which will be described later, can be inserted and removed.

Further, a plurality of protrusions 122*f* is formed on the radially outer side of the left surface of the base portion 122*a*, the protrusions 122*f* projecting to the left. The radially outer portion of a circuit board 41 constituting the circuit unit 40 is held in the left-right direction between the tips of these protrusions 122*f* and the stepped portion formed in the recess 21*k* of the mounting member 21 when the inner case 122 is fixed to the mounting member 21. Accordingly, the circuit board 41 can be securely supported between the inner case 122 and the mounting member 21 (see FIG. 3).

Further, a pair of bosses 122*g* is provided in the base portion 122*a*, the bosses 122*g* having through holes through which the screws 123 extend (See FIGS. 4 and 5).

Figure 6:
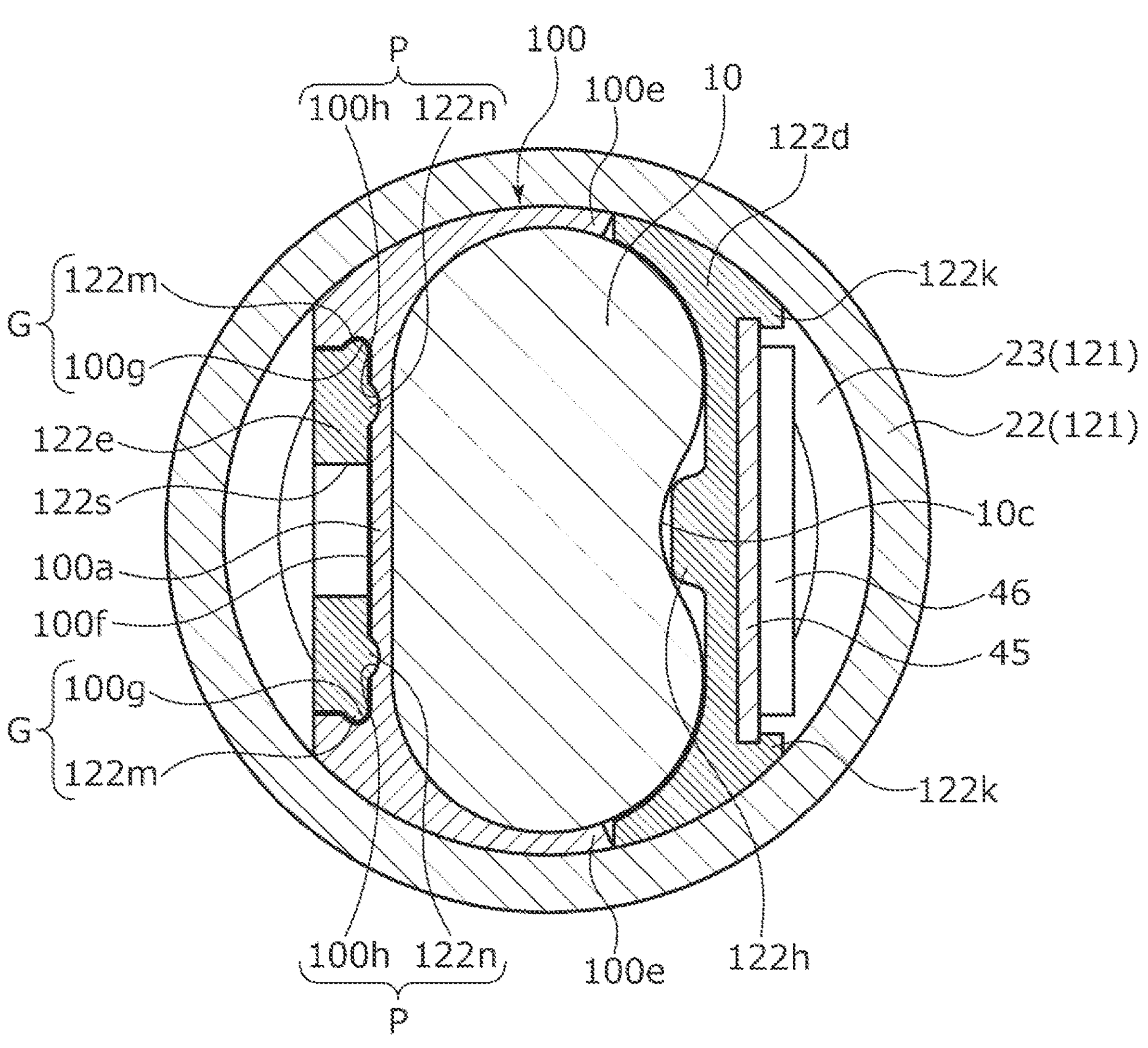
FIG. 6 is a cross-sectional view taken along the line A-A of FIG. 3.

As illustrated in FIGS. 4 and 6, the inner surface of the first plate portion 122*d* is curved along the surface shape of the battery 10 held by the battery holder 100. Further, a rectangular protrusion 122*h* is formed in the left end portion (the right end portion in FIG. 4) of the inner surface of the first plate portion 122*d*, and can be fitted into a recess 10*c* (see FIGS. 2 and 3) formed on the surface of the battery 10. Accordingly, a direction in which the battery holder 100 is inserted into and removed from the inner case 122 can be restricted to prevent the reverse connection of the battery 10.

Further, as illustrated in FIGS. 5 and 6, the outer surface of the first plate portion 122*d* forms a flat surface at the substantially vertically central portions, and a pair of upper and lower hook-shaped projections 122*k* is provided at the upper and lower end portions of the first plate portion 122*d* at each of two locations in the left-right direction, and can hold the circuit board 45 constituting the circuit unit 40. The circuit board 45 is inserted between the upper and lower projections 122*k* from the right side of the first plate portion 122*d*. Further, the upper and lower side surfaces of the first plate portion 122*d* are curved along the inner periphery of the cover member 22 constituting the outer case 121.

As illustrated in FIGS. 4 and 6, the second plate portion 122*e* is formed to have a smaller dimension in the vertical direction, namely, in the lateral direction than the first plate portion 122*d*. Further, a pair of protruded portions 122*m* is formed on the inner surface side of the upper and lower end portions of the second plate portion 122*e* to extend in the left-right direction, namely, the longitudinal direction, which is the direction of insertion and removal of the battery holder 100. The protruded portions 122*m* each form a semicircular shape in cross section.

Further, a pair of upper and lower hemispherical protrusions 122*n* is formed at the left end portion (the right end portion in FIG. 4) on the inner surface of the second plate portion 122*e*.

Further, a substantially rectangular cutout 122*s* is formed at a substantially vertically central portion of the right end portion (the left end portion in FIG. 4) of the second plate portion 122*e*. The cutout 122*s* is formed in the second plate portion 122*e* to prevent a tool such as a driver from interfering with the second plate portion 122*e*. This facilitates the tightening of the screws 123 into the through holes of the bosses 122*g* formed in the base portion 122*a*.

Next, the battery holder 100 will be described. In the first embodiment, an aspect of holding the pack lithium battery 10 (hereinafter, simply referred to as "battery 10") that includes a positive electrode 10*a* and a negative electrode 10*b* arranged side by side on one end side of the battery holder 100 in the longitudinal direction will be described. In the first embodiment, the positive terminal and the negative terminal on the side of the battery 10 are the positive electrode 10*a* and the negative electrode 10*b* of the battery 10.

Figure 7:
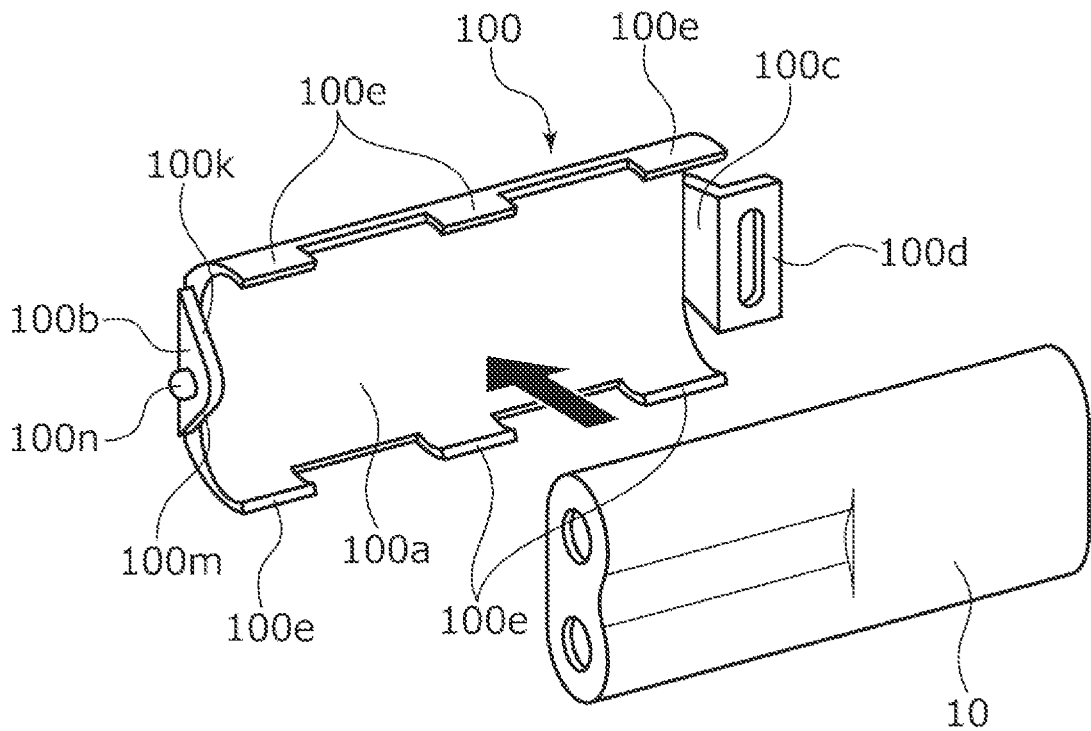
FIG. 7 is an exploded perspective view illustrating the structure of the battery holder and the battery in the first embodiment.

As illustrated in FIGS. 6 and 7, the battery holder 100 mainly includes a base portion 100*a*, wall portions 100*b*, 100*c*, and a handle 100*d*. The base portion 100*a* has an inner surface curved along the surface shape of the battery 10. The wall portion 100*b* is formed into a substantially triangular shape standing from the left end portion of the base portion 100*a* toward the inner surface side. The wall portion 100*c* is formed into a rectangular shape standing from the right end portion of the base portion 100*a* toward the inner surface side. The handle 100*d* bends from the wall portion 100*c* and extends to the right.

As illustrated in FIG. 2, the wall portion 100*b* forms a substantially triangular shape, and is in contact with one end of the battery 10 in the longitudinal direction at the inner surface with the battery 10 held by the battery holder 100. Accordingly, the positive electrode 10*a* and the negative electrode 10*b* of the battery 10 are exposed from cutout spaces 100*k*, 100*m* (see FIG. 7) of the battery holder 100. The wall portion 100*b* may be formed into any shape as long as a positive terminal 42 and a negative terminal 43 can extend through the wall portion 100*b* and the wall portion 100*b* can expose the positive electrode 10*a* and the negative electrode 10*b* of the battery 10 so that they can be in contact with the electrical contacts of the positive terminal 42 and the negative terminal 43, respectively, and instead of the cutout shape, a through hole may be formed in the wall portion.

Further, the wall portion 100*b* is formed so as to overhang on the left side of the left end of the base portion 100*a*, and is provided with a projection 100*n* provided at a substantially central portion of the outer surface thereof and projecting to the left (see FIG. 7).

A pair of upper and lower paired claws 100*e* is provided at each of three locations in the left-right direction at the upper and lower end portions of the base portion 100*a* and can hold the battery 10.

Further, as illustrated in FIG. 6, the base portion 100*a* has an outer surface forming a flat surface at substantially vertically central portion, and has an insertion recess 100*f*.

The insertion recess 100*f* is open to the left side (the right side in FIG. 4) on which the wall portion 100*b* is formed, so that the second plate portion 122*e* of the inner case 122 can be inserted from the right side (the left side in FIG. 4) into the insertion recess 100*f*. A pair of recessed grooves 100*g* is formed on the inner surface side of the upper and lower inner walls of the insertion recess 100*f*, the grooves 100*g* extending in the left-right direction, namely, in the longitudinal direction, that is the direction of insertion and removal of the battery holder 100, and facing each other in the vertical direction, namely, in the lateral direction. The recessed grooves 100*g* each forms a semicircular shape in cross section, and constitute a pair of guide portions G that guides the movement of the battery holder 100 in a direction of insertion and removal together with the pair of protruded portions 122*m* formed on the inner case 122 described above.

Further, the bottom surface of the insertion recess 100*f* has a pair of upper and lower hemispherical recesses 100*h* formed at the left end portion (the right end portion in FIG. 4). The pair of protrusions 122*n* formed on the inner case 122 described above can be recess-protrusion fitted into the recesses 100*h* to constitute positioning mechanisms P for the battery holder 100 and to lock the battery holder 100 so that it would not move in the left-right direction accidentally. Further, the wall portion 100*b* of the battery holder 100 extends through the through hole 122*t* of the inner case 122 with the protrusions 122*n* of the inner case 122 recess-protrusion fitted into the recesses 100*h* (see FIG. 3).

Next, the circuit unit 40 will be described. As illustrated in FIG. 3, the circuit unit 40 mainly includes the disk-shaped circuit board 41, the positive terminal 42 and the negative terminal 43, and a rectangular plate-shaped circuit board 45 on which a processing chip 44 and a wireless chip 46 are mounted (see FIG. 5). The circuit board 41 is placed in the recess 21*k* of the large diameter portion 21*d* in the mounting member 21. The positive terminal 42 and the negative terminal 43 are arranged side by side so as to extend through the circuit board 41 in the thickness direction. The circuit board 45 is held on the outer surface of the first plate portion 122*d* of the inner case 122, which will be described later. The processing chip 44 adjusts the electric power supplied from the battery 10, processes the signal input from the sensor unit 30, and the like. The wireless chip 46 is provided on the circuit board 45 and performs communication with the outside. The circuit board 41 and the circuit board 45 are electrically connected to each other by a flexible flat cable 47. Further, the positive terminal 42 and the negative terminal 43 may not extend through the circuit board 41 in the thickness direction.

As illustrated in FIGS. 3 and 4, the positive terminal 42 and the negative terminal 43 are so-called probe pins, and constitute a positive terminal and a negative terminal on the load side. Specifically, the positive terminal 42 and the negative terminal 43 have a plunger structure, and are fixed by being inserted into and soldered to a pair of attachment holes extending through the circuit board 41 in the left-right direction, respectively. Further, the positive terminal 42 and the negative terminal 43 have electrical contacts formed at the right ends and being extendable in an axial direction. When the battery holder 100 is attached, the electrical contacts are pressed and are retracted in the axial direction (see FIG. 8). When the battery holder 100 is detached, the electrical contacts are elastically restored and extend in the axial direction (see FIG. 9).

Further, the shape of the tips of the positive terminal 42 and the negative terminal 43 on which the electrical contacts are formed forms a planar shape, so that the area of contact with the positive electrode 10*a* and the negative electrode 10*b* of the battery 10 can be increased to distribute the stress. Accordingly, surface damage to the electrical contacts of the positive terminal 42 and the negative terminal 43 on the load side due to rattling of the battery 10 or the like is prevented.

Further, the positive terminal 42 and the negative terminal 43 extend through two through holes 122*b*, 122*c* that are formed side by side to extend through a base portion 122*a* of the inner case 122 in the thickness direction, and are supported to be retractable to the left with respective electrical contacts projecting from the through holes 122*b*, 122*c*. As illustrated in FIG. 3, the positive terminal 42 and the negative terminal 43 are slightly retracted to the left with the battery holder 100 attached. That is, the electrical contacts of the positive terminal 42 and the negative terminal 43 are in elastic pressure contact with the positive electrode 10*a* and the negative electrode 10*b* of the battery 10 held by the battery holder 100, respectively.

Further, a switch 48 is provided between the positive terminal 42 and the negative terminal 43 and is fixed to a substantially central portion on the right surface of the circuit board 41. The switch 48 is a return switch that projects so as to be returnable in the extending direction of the electrical contacts of the positive terminal 42 and the negative terminal 43, that is, in the right direction by urging means (not illustrated) placed therein. Further, the switch 48 is configured as a so-called momentary switch that connects the circuit only when pressed. The amount of projection of the switch 48 to the right is configured to be smaller than the amount of projection of the positive terminal 42 and the negative terminal 43 to the right.

Accordingly, when the positive electrode 10*a* and the negative electrode 10*b* of the battery 10 held by the battery holder 100 are brought into contact with the electrical contacts of the positive terminal 42 and the negative terminal 43, and the switch 48 is pressed by the projection 100*n* of the battery holder 100, the circuit unit 40 can be energized to supply power from the battery 10 to the sensor unit 30. Further, the circuit unit 40 receives an input of a pressure signal from the sensor unit 30, so that signal-processing can be performed by the processing chip 44 and the communication with the outside can be performed by the wireless chip 46.

The process of attachment and detachment of the battery holder 100 holding the battery 10 will be now described. For convenience of explanation, the outer case 121 and the inner case 122 are not illustrated in FIGS. 8 and 9. Further, for convenience of explanation, only the reference numeral 40 is used for the load in FIGS. 8 and 9.

Figures 8A, 8B, 8C:
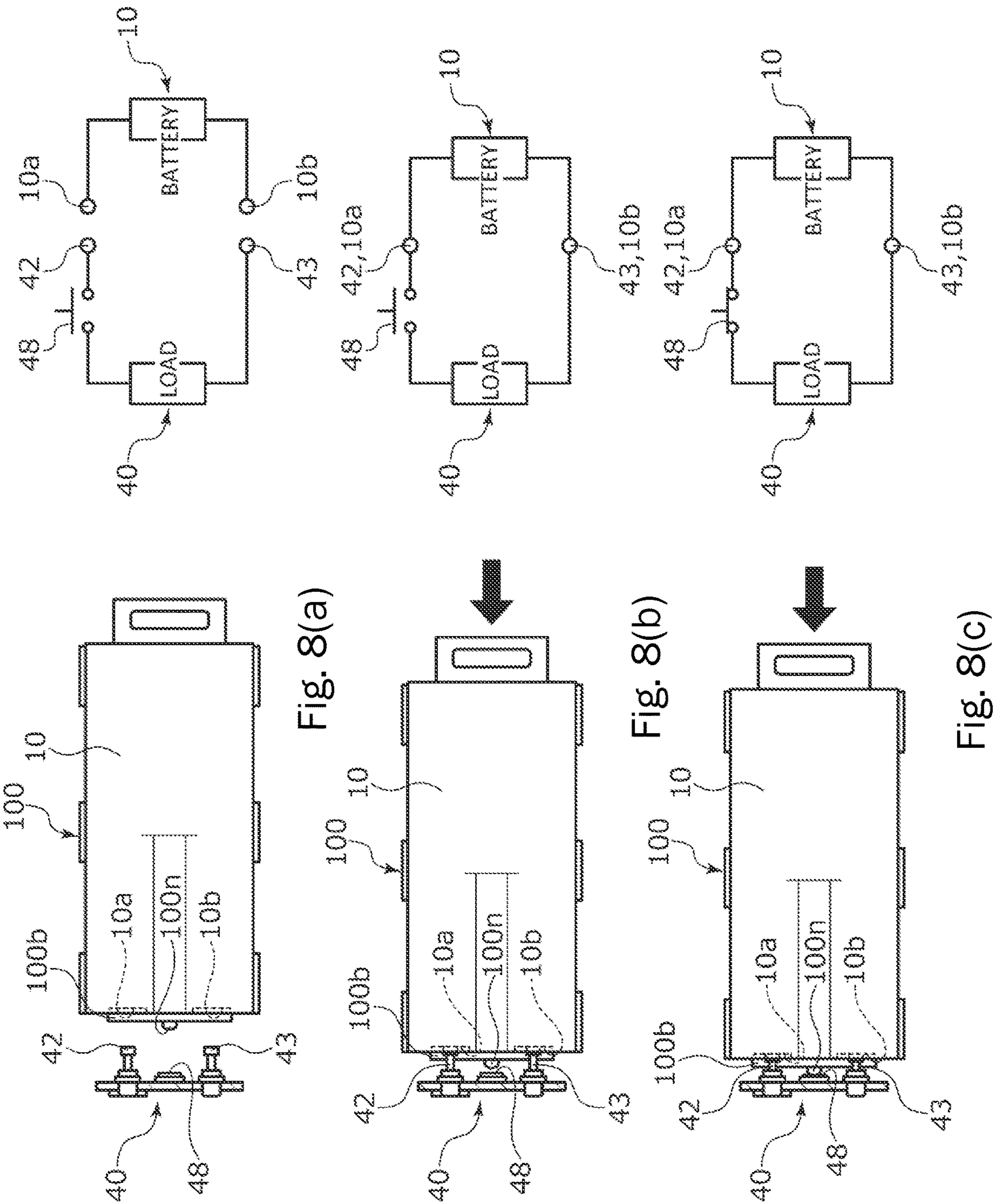
FIG. 8 (*a*)-8(*c*) are image diagrams illustrating the contact state between a positive electrode and a negative electrode of the battery and a positive terminal and a negative terminal of the pressure sensor in the process of attachment of the battery holder, and the operation of a switch due to a projection of the battery holder, and schematic circuit diagrams corresponding to the image diagrams in the first embodiment.

As illustrated in FIG. 8, in the process of attachment of the battery holder 100, when the cap member 23 is removed and the battery holder 100 holding the battery 10 is inserted through the opening 22*a* of the cover member 22 (see FIG. 3), the positive electrode 10*a* and the negative electrode 10*b* of the battery 10 are brought into contact with the electrical contacts of the positive terminal 42 and the negative terminal 43 on the load side constituting the circuit unit 40 (see FIG. 8B). At this time, the projection 100*n* provided on the wall portion 100*b* of the battery holder 100 is separated from the switch 48 in the right direction. That is, the positive electrode 10*a* and the negative electrode 10*b* of the battery 10 are in contact with the electrical contacts of the positive terminal 42 and the negative terminal 43 on the load side, respectively, but the positive electrode 10*a* of the battery 10 and the positive terminal 42 on the load side are electrically disconnected to each other due to the switch 48 being turned off. The negative electrode 10*b* of the battery 10 and the negative terminal 43 on the load side are electrically connected to each other.

When the battery holder 100 is further pushed to the left from the state illustrated in FIG. 8B, the electrical contacts of the positive terminal 42 and the negative terminal 43 on the load side are retracted in the left direction in pressure contact with the positive electrode 10*a* and the negative electrode 10*b* of the battery 10. In the process of the electrical contacts of the positive terminal 42 and the negative terminal 43 on the load side being retracted, the projection 100*n* of the battery holder 100 is brought into contact with the switch 48, and the switch 48 is pressed. Accordingly, the switch 48 is turned on, so that the positive electrode 10*a* of the battery 10 and the positive terminal 42 on the load side are electrically connected to each other (see FIG. 8C).

Accordingly, when the battery 10 is attached, the negative terminal 43 on the load side is electrically connected to the negative electrode 10*b* of the battery 10 before the positive terminal 42 on the load side, so that the positive electrode 10*a* of the battery 10 and the positive terminal 42 on the load side can be electrically connected to each other with the reference potential of the circuit being determined, to set the circuit to the target potential difference.

Figures 9A, 9B, 9C:
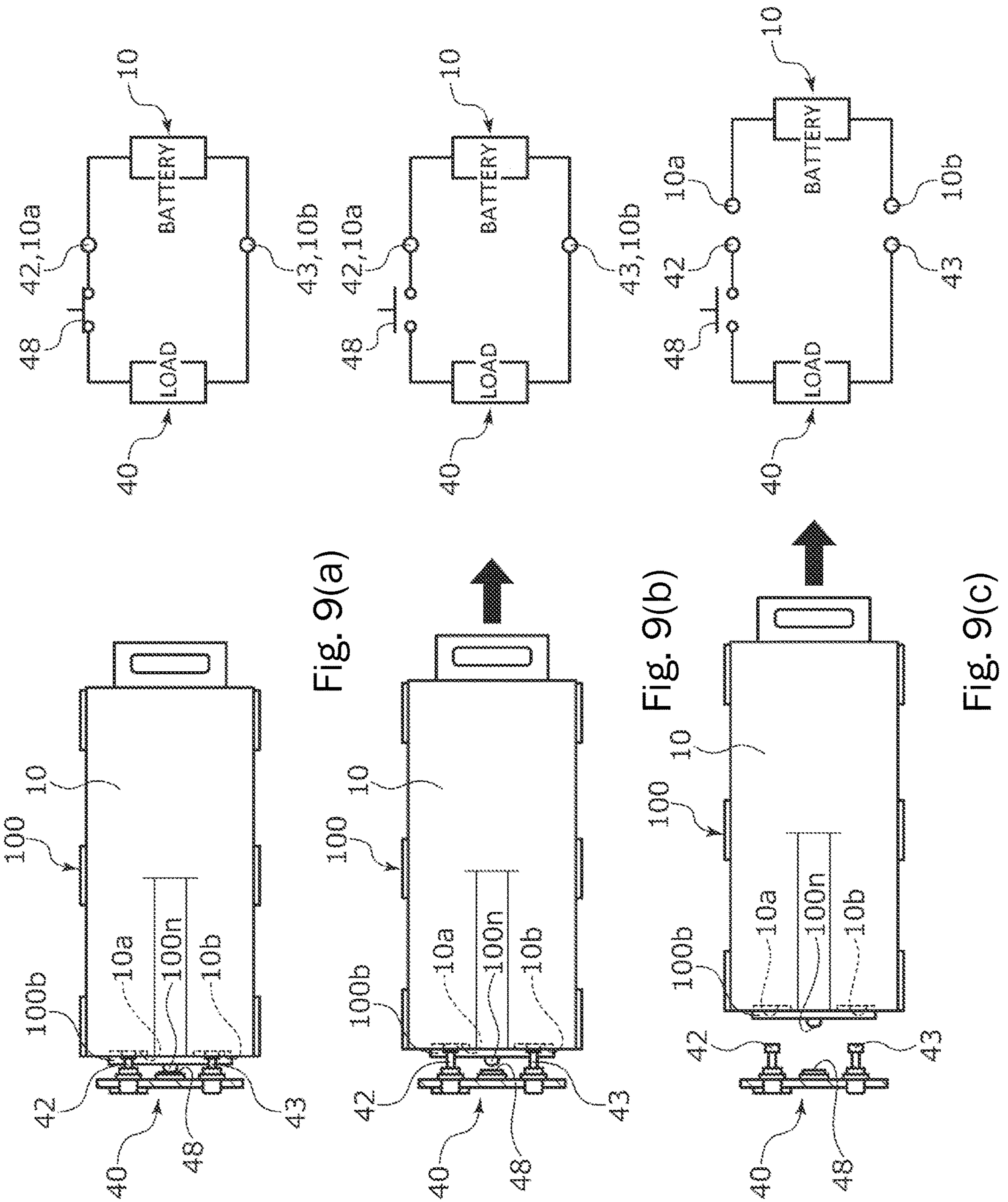
FIG. 9 (*a*)-9(*c*) are image diagrams illustrating the contact state between the positive electrode and the negative electrode of the battery and the positive terminal and the negative terminal of the pressure sensor in the process of detachment of the battery holder, and the operation of the switch due to the projection of the battery holder, and schematic circuit diagrams corresponding to the image diagrams in the first embodiment.

Further, as illustrated in FIG. 9, when the battery holder 100 is pulled out to the right from the opening 22*a* (see FIG. 3) of the cover member 22 in the process of detachment of the battery holder 100, the projection 100*n* of the battery holder 100 is separated from the switch 48 in the right direction with the positive terminal 42 and the negative terminal 43 on the load side being pressed against the positive electrode 10*a* and the negative electrode 10*b* of the battery 10 (see FIG. 9B). That is, the switch 48 is turned off, so that the positive electrode 10*a* of the battery 10 and the positive terminal 42 on the load side are electrically disconnected to each other with the positive electrode 10*a* and the negative electrode 10*b* of the battery 10 being in contact with the respective electrical contacts of the positive terminal 42 and the negative terminal 43 on the load side. The negative electrode 10*b* of the battery 10 and the negative terminal 43 on the load side are kept electrically connected to each other.

When the battery holder 100 is further pulled out to the right from the state of FIG. 9B, the positive electrode 10*a* and the negative electrode 10*b* of the battery 10 are separated to the right from the electrical contacts of the positive terminal 42 and the negative terminal 43 on the load side (see FIG. 9C).

Accordingly, when the battery 10 is detached, the electrical connection between the negative terminal 43 on the load side and the negative electrode 10*b* of the battery 10 is maintained, and the positive electrode 10*a* of the battery 10 and the positive terminal 42 can be first electrically disconnected to each other with the reference potential of the circuit being determined.

In this way, in the process of attachment and detachment of the battery holder 100 holding the battery 10, with the reference potential of the circuit being always determined due to the electrical connection between the negative terminal 43 on the load side and the negative electrode 10*b* of the battery 10, the electrical connection/disconnection between the positive electrode 10*a* of the battery 10 and the positive terminal 42 on the load side can be switched by turning on/off of the switch 48. That is, the connection state can be switched from connection to disconnection or from disconnection to connection. Accordingly, the circuit can be reliably set to the target potential difference without being affected by the residual charge in the processing chip 44, the wireless chip 46, etc. provided on the load side, to enable the stable circuit operation. This makes it possible to prevent malfunctions and failures of circuit components such as the processing chip 44 and the wireless chip 46.

Further, since the switch 48 is provided on a member on the load side, that is, on the circuit board 41 constituting the circuit unit 40, for example, a specially shaped battery provided with the switch and a battery holder are not required to be used, and various types of batteries can be used.

Further, the switch 48 is a return switch that projects so as to be returnable in the extending direction of the positive terminal 42 and the negative terminal 43, that is, in the right direction, and the positive terminal 42 and the negative terminal 43 are also returnable in the right direction. Accordingly, as illustrated in FIGS. 8 and 9, the order of electrical connection between the positive electrode 10*a* and the negative electrode 10*b* of the battery 10 and the positive terminal 42 and the negative terminal 43 on the load side can be determined according to the operation of attaching and detaching the battery holder 100 holding the battery 10.

Further, the switch 48 is pressed by the projection 100*n* of the battery holder 100 according to the operation of attaching and detaching the battery holder 100 holding the battery 10. Accordingly, the operation timing of the switch 48 can be adjusted according to the projection amount of the projection 100*n*.

Further, positioning mechanisms P are provided between the inner case 122 and the battery holder 100 to define the progress of insertion of the battery holder 100 by recess-protrusion fitting of the recesses 100*h* and the protrusions 122*n*. Accordingly, the switch 48 can be reliably pressed by the projection 100*n* of the battery holder 100, and the movement of the battery holder 100 in the left-right direction can be restricted to reliably hold the state of the switch 48 being pressed by the projection 100*n*. Further, the positive electrode 10*a* and the negative electrode 10*b* of the battery 10 held by the battery holder 100 can be brought into contact with the electrical contacts of the positive terminal 42 and the negative terminal 43 on the load side with an appropriate force.

Further, the battery holder 100 can be inserted and removed with the pressure sensor 1 installed in the installed portion such as a pipe to facilitate the battery replacement. Specifically, without removing the entire housing 20 from the installed portion such as pipe, only the cap member 23 is detached, and only the battery holder 100 holding the battery 10 is inserted and removed, so that the battery replacement can be easily made. Accordingly, the sensor unit 30 and the circuit unit 40 are not required to be touched and moved at the time of battery replacement, so that the pressure sensor 1 can stably sense the object to be measured.

Second Embodiment

An electronic device according to a second embodiment of the present invention will be described with reference to FIG. 10. The redundant descriptions of the same configuration as in the first embodiment will be omitted. Further, in FIG. 10, for convenience of explanation, only the circuit board which is a member on the load side and the positive terminal and the negative terminal on the load side are illustrated.

Figure 10:
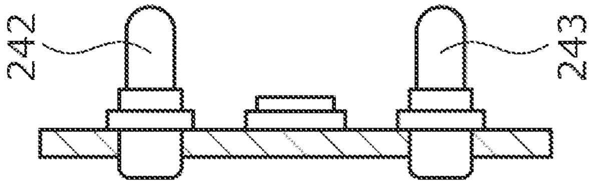
FIG. 10 is a diagram illustrating a positive terminal and a negative terminal of a pressure sensor as an electronic device according to a second embodiment of the present invention.

As illustrated in FIG. 10, in the second embodiment, the shape of the tips of a positive terminal 242 and a negative terminal 243 on the load side where the electrical contacts are formed forms a curved surface shape.

Accordingly, since the shape of the tips of the positive terminal 242 and the negative terminal 243 on the load side on which the electrical contacts are formed forms a curved surface shape, they are not likely to be damaged due to repeated work such as battery replacement, and the inclination between the positive terminal 242 and the negative terminal 243 and the positive electrode 10*a* and the negative electrode 10*b* of the battery 10 can be absorbed.

Third Embodiment

An electronic device according to a third embodiment of the present invention will be described with reference to FIG. 11. The redundant descriptions of the same configuration as in the first embodiment will be omitted. Further, in FIG. 11, for convenience of explanation, only the circuit board which is a member on the load side and the positive terminal and the negative terminal on the load side are illustrated.

Figure 11:
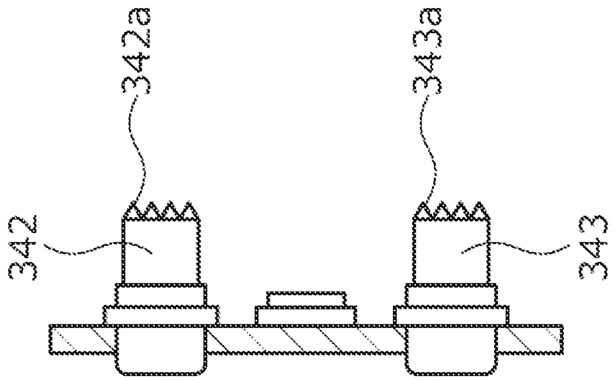
FIG. 11 is a diagram illustrating a positive terminal and a negative terminal of a pressure sensor as an electronic device according to a third embodiment of the present invention.

As illustrated in FIG. 11, in the third embodiment, the shape of the tips of a positive terminal 342 and a negative terminal 343 on the load side on which the electrical contacts are formed forms an uneven shape with a plurality of pointed projections 342*a* and 343*a*, respectively.

Accordingly, since the shape of the tips of the positive terminal 342 and the negative terminal 343 on the load side on which the electrical contacts are formed forms an uneven shape with the plurality of pointed projections 342*a* and 343*a*, respectively, the contact points with the positive electrode 10*a* and the negative electrode 10*b* of the battery 10 can be increased to distribute the stress. Accordingly, surface damage to the electrical contacts of the positive terminal 342 and the negative terminal 343 on the load side due to rattling of the battery 10 is prevented.

Although the embodiments of the present invention have been described above with reference to the drawings, the specific configuration is not limited to these embodiments, and any changes or additions made without departing from the scope of the present invention are included in the present invention.

For example, the electronic device according to the present invention is not limited to the pressure sensor, and may be applied to other sensors or electronic devices other than sensors as long as it includes a battery as the power source.

Further, the electronic device may be configured such that a battery other than the pack lithium battery described above, for example, a button cell, an AA battery, a AAA battery, a square battery, and a coin battery can be held by the battery holder.

Further, in the first to third embodiments, the configuration in which the positive electrode and the negative electrode of the battery held by the battery holder as the positive terminal and the negative terminal on the battery side are brought into direct contact with the positive terminal and the negative terminal on the load side has been described. However, the present invention may be limited to this, and the wall portion standing at one end of the battery holder in the longitudinal direction may be provided with electrode terminals which are electrically connected to the battery and can be brought into contact with the positive terminal and the negative terminal on the load side. Further, as long as the positive terminal and the negative terminal on the battery side are arranged side by side in the vertical direction, the left and right positions thereof may not be the same.

Further, the tip shape of the positive terminal and the negative terminal on the load side may form other tip shapes other than the shapes illustrated in the first to third embodiments.

Further, the positive terminal and the negative terminal on the load side may not be configured as probe pins, and may be configured as other electrode terminals such as leaf springs and coil springs.

Further, in the above embodiments, the battery holder is described as being provided with a projection, but the present invention is not limited to this, and the switch may be configured to be pressed by the outer surface of the wall portion of the battery holder by increasing the amount of projection of the switch.

Further, the switch may not be configured as a push momentary switch, and may be configured as other switches such as a reed switch.

Further, the switch may be provided not on a member on the load side but on a member on the battery side, for example, on the battery holder.

Further, in the first to third embodiments, the mode in which in the process of attachment and detachment of the battery, the positive terminal and the negative terminal on the load side are brought into contact with and separated from the positive terminal and the negative terminal on the battery side substantially at the same time, and the electrical connection/disconnection between the positive terminal on the battery side and the positive terminal on the load side is switched by the switch has been described, but the present invention is not limited to this, and the switch may not be provided and the amount of projection of the negative terminal on the load side may be configured to be larger than the amount of projection of the positive terminal on the load side. Accordingly, when the battery is attached, the negative terminal on the load side can be brought into contact with the negative terminal on the battery side before the positive terminal on the load side, and the positive terminal on the load side can be then brought into contact with the positive terminal on the battery side. When the battery is detached, the positive terminal on the load side can be first separated from the positive terminal on the battery side, and the negative terminal on the load side can be then separated from the negative terminal on the battery side. Accordingly, the reference potential of the circuit can always be determined due to the electrical connection between the negative terminal on the load side and the negative terminal on the battery side.

Further, the processing chip and the wireless chip constituting the circuit unit may be provided at any position on the circuit board.

Further, the electronic device according to the present invention is not limited to the one in which the battery holder for holding the battery is attached to and detached from the body of the electronic device, but may be the one in which the battery is directly attached to and detached from the body of the electronic device.

REFERENCE SIGNS LIST

1 pressure sensor (electronic device)
10 pack lithium battery (battery)
10*a* positive electrode (positive terminal of battery side)
10*b* negative electrode (negative terminal of battery side)
20 housing
21 mounting member
22 cover member
23 cap member
30 sensor unit (load)
40 circuit unit (load)
41 circuit board (member on load side)
42 positive terminal (positive terminal on load side)
43 negative terminal (negative terminal on load side)
44 processing chip
45 circuit board
46 wireless chip
48 switch (return switch)
100 battery holder
100*b*, 100*c* wall portion
100*d* handle
100*e* claw
100*g* recessed groove
100*h* recess
100*n* projection
121 outer case
122 inner case
122*b*, 122*c* through hole
122*d* first plate portion
122*e* second plate portion
122*m* protruded portion
122*n* protrusion
122*t* through hole
G guide portion
P positioning mechanism

The invention claimed is:

1. An electronic device comprising:
a battery holder configured for holding a battery;
a housing to which the battery holder is detachably attached;
a load; and
a circuit unit attached to the housing and configured for energizing the load in accordance with attachment of the battery holder to the housing, wherein,
the battery holder has a battery side positive terminal and a battery side negative terminal,
the circuit unit has a switch, a load side positive terminal and a load side negative terminal,
the switch is a return switch that projects so as to be returnable in an extending direction of electrical contacts of the load side positive terminal and the load side negative terminal,
the battery holder is provided with a projection which projects toward the switch,
the load side positive terminal and the load side negative terminal projects toward the battery side positive terminal and the battery side negative terminal, respectively, such that an amount of projection of the switch is smaller than an amount of projection of the load side positive terminal and the load side negative terminal, and
in a process of the attachment and the detachment of the battery holder to and from the housing, the load side positive terminal and the battery side positive terminal are electrically connected to and disconnected from each other in a state in which the load side negative terminal is electrically connected to the battery side negative terminal.

2. The electronic device according to claim 1, wherein the positive terminal and the negative terminal on the load side are arranged side by side.

3. The electronic device according to claim 1, wherein the load side positive terminal and the load side negative terminal are returnable in the extending direction.

4. The electronic device according to claim 1, further comprising a positioning mechanism configured for positioning the battery holder.

5. The electronic device according to claim 1, wherein the battery side positive terminal and the battery side negative terminal are a positive terminal and negative terminal originally formed in the battery, respectively.

* * * * *